United States Patent
Feltham et al.

(10) Patent No.: US 12,122,275 B2
(45) Date of Patent: Oct. 22, 2024

(54) VENTILATED SEAT INTEGRATED INTO VEHICLE HEATING, VENTILATION, AND AIR CONDITIONING (HVAC) SYSTEM

(71) Applicant: Rivian IP Holdings, LLC, Plymouth, MI (US)

(72) Inventors: Graham Lloyd Feltham, Irvine, CA (US); Jake DeBoer, Mission Viejo, CA (US); Kamalesh Bhambare, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/073,025

(22) Filed: Dec. 1, 2022

(65) Prior Publication Data
US 2023/0158929 A1 May 25, 2023

Related U.S. Application Data

(63) Continuation of application No. 17/390,710, filed on Jul. 30, 2021, now Pat. No. 11,535,131.

(51) Int. Cl.
*B60N 2/56* (2006.01)
*B60N 2/68* (2006.01)

(52) U.S. Cl.
CPC ......... *B60N 2/5628* (2013.01); *B60N 2/5685* (2013.01)

(58) Field of Classification Search
CPC ... B60N 2/5657; B60N 2/5628; B60N 2/5642
See application file for complete search history.

(56) References Cited

U.S. PATENT DOCUMENTS

| | | | |
|---|---|---|---|
| 6,179,706 B1 | 1/2001 | Yoshinori et al. | |
| 6,644,735 B2 | 11/2003 | Bargheer et al. | |
| 6,871,696 B2 | 3/2005 | Aoki et al. | |
| 9,346,384 B2 | 5/2016 | Zhang et al. | |
| 10,358,062 B2 | 7/2019 | Arata | |
| 10,967,768 B2 | 4/2021 | Shiga | |

(Continued)

FOREIGN PATENT DOCUMENTS

| | | |
|---|---|---|
| DE | 202004013691 U1 | 1/2006 |
| DE | 102015225517 A1 | 3/2017 |

(Continued)

OTHER PUBLICATIONS

"Front Seat Components fit your 2018 Acura RDX 5 Door ADV (AWD) KA 6AT", Acura RDX, retrieved from https://www.acurapartswarehouse.com/parts-list/2018-acura-rdx-5dr_adv_awd-ka6at/interior_bumper/front_seat_components.html?diagram=1588430, retrieved on Jul. 26, 2022, 6 pages.

(Continued)

*Primary Examiner* — Shin H Kim
(74) *Attorney, Agent, or Firm* — Haley Guiliano LLP

(57) ABSTRACT

A ventilated seat, a vehicle including the ventilated seat, and a method of controlling airflow in a vehicle having a ventilated seat are provided. The ventilated seat includes a seat cushion assembly and an air duct configured to interface with a heating, ventilation, and air conditioning (HVAC) module of the vehicle and provide conditioned air from the HVAC module to the seat cushion assembly. The HVAC module of the vehicle further provides conditioned air to an interior cabin of the vehicle through at least one air vent.

20 Claims, 8 Drawing Sheets

(56) References Cited

U.S. PATENT DOCUMENTS

| | | | |
|---|---|---|---|
| 11,167,672 | B2 | 11/2021 | Hoshi et al. |
| 11,203,277 | B1 | 12/2021 | Yu et al. |
| 11,279,272 | B2 | 3/2022 | Hoshi et al. |
| 2005/0225128 | A1* | 10/2005 | Diemer .................. H05B 3/146 |
| | | | 297/180.12 |
| 2006/0032265 | A1 | 2/2006 | Shaw |
| 2007/0069554 | A1* | 3/2007 | Comiskey ............ B60N 2/5692 |
| | | | 432/27 |
| 2011/0226461 | A1 | 9/2011 | Fujii et al. |
| 2011/0260509 | A1 | 10/2011 | Siu |
| 2019/0047449 | A1 | 2/2019 | Fujii et al. |
| 2019/0241043 | A1 | 8/2019 | Ito et al. |
| 2020/0039397 | A1 | 2/2020 | Shiga |
| 2021/0101509 | A1 | 4/2021 | Hoshi et al. |
| 2021/0122273 | A1 | 4/2021 | Shiga |
| 2021/0300218 | A1 | 9/2021 | Greenwood et al. |

FOREIGN PATENT DOCUMENTS

| | | |
|---|---|---|
| DE | 102018101504 A1 | 7/2018 |
| DE | 102019201067 A1 | 8/2019 |

OTHER PUBLICATIONS

"Front Seat fit your 2018 Acura RDX 5 Door ADV (AWD) KA 6AT", Acura RDX, retrieved from https://www.acurapartswarehouse.com/parts-list/2018-acura-rdx-5dr_adv_awd-ka6at/interior_bumper/front_seat.html?diagram=1588428, retrieved on Jul. 26, 2022, 5 pages.

"Search Genuine Front Seat Parts for Jaguar I-pace 2018>", Jaguar Land Rover Classic Parts, retrieved from https://parts.jaguarlandroverclassic.com/parts/index/hierarchy/id/C82.C8275.C8275525/brand/jaguar/, retrieved on Jul. 26, 2022, 4 pages.

"Seats & tracks. Front seat components . . . 2018 Audi 3.0L V6 A/T Quattro", Audi of America, Inc, retrieved from https://parts.audiusa.com/a/Audi_2018_A7-30L-V6-AT-Quattro/_51505_6787543/SEATS-TRACKS-FRONT-SEAT-COMPONENTS/1331580.html?assemblySearchGuid=6E1B7107-A47F-452B-9045-21985CF3A6BE, retrieved on Jul. 26, 2022, 10 pages.

"Seats & tracks. Front seat Components . . . 2018 Audi A73.06L V6 A/T Quattro", Audi of America, Inc, Retrieved from https://parts.audiusa.com/a/Audi_2018_A7-30L-V6-AT-Quattro/_51505_6787523/SEATS-TRACKS-FRONT-SEAT-COMPONENTS/1331585.html?assemblySearchGuid=6E1B7107-A47F-452B-9045-21985CF3A6BE, retrieved on Jul. 26, 2022, 7 pages.

"Seats & tracks. Front seat components . . . 2019 Audi Q8 Prestige Sport Utility", Audi of America, Inc, retrieved from https://parts.audiusa.com/a/Audi_2019_Q8-Prestige-Sport-Utility/_51505_7626172/SEATS-TRACKS-FRONT-SEAT-COMPONENTS/1392545.html?assemblySearchGuid=E1EA233C-C613-413D-8E31-1C35DB604E78, Retrieved on Jul. 26, 2022, 7 pages.

"Seats & Tracks. Front Seat Components . . . 2019 Audi Q8 Prestige Sport Utility", Audi of America, Inc, Retrieved from https://parts.audiusa.com/a/Audi_2019_Q8-Prestige-Sport-Utility/_51505_7626173/Seats-tracks-Front-seat-components/1392540.html?assemblySearchGuid=E1EA233C-C613-413D-8E31-1C35DB604E78, retrieved on Jul. 26, 2022, 10 pages.

* cited by examiner

VENTILATED SEAT INTEGRATED INTO VEHICLE HEATING, VENTILATION, AND AIR CONDITIONING (HVAC) SYSTEM

CROSS-REFERENCE TO RELATED APPLICATIONS

This application is a continuation of U.S. patent application Ser. No. 17/390,710, filed Jul. 30, 2021, the disclosure of which is hereby incorporated by reference herein in its entirety.

SUMMARY

To improve the thermal comfort of an occupant of a vehicle, it is advantageous to provide vehicle seats that can be both heated and cooled. A heated, cooled, and ventilated seat is described that provides energy-efficient heating and cooling, not previously achievable, to an occupant of a vehicle, without adding cost and complexity to the seat.

A ventilated seat for a vehicle that includes a seat cushion assembly and an air duct configured to provide conditioned air from the HVAC module to the seat cushion assembly. Because the HVAC module of the vehicle further provides conditioned air to an interior cabin of the vehicle through at least one air vent, additional active components for providing cooling (e.g., Peltier devices) can be omitted from the ventilated seat. Furthermore, because conditioned air is provided from the HVAC module of the vehicle, thermal performance of the ventilated seat may be improved.

In some embodiments, the seat cushion assembly may include a seat bottom cushion assembly and a seat back cushion assembly.

In some embodiments, the air duct includes a splitter portion, a first air duct portion extending from the HVAC module to the splitter portion, a second air duct portion extending from the splitter portion to the seat bottom cushion assembly, and a third air duct portion extending from the splitter portion to the seat back cushion assembly.

In some embodiments, the first air duct portion may include a first extender (e.g., accordion) section that is extendable to allow the ventilated seat to move in a first direction (e.g., forward or backward) in the vehicle interior cabin, for example, between a forward position and a rear position, while continuing to provide conditioned air from the HVAC module to the seat cushion assembly. The splitter portion may include a second extender (e.g., accordion) section that is extendable to allow the ventilated seat to be moved in a second direction (e.g., raised or lowered upward or downward) in the vehicle interior cabin, for example, between a first height and a second height, while continuing to provide conditioned air from the HVAC module to the seat cushion assembly. The third air duct portion comprises a hinge section that allows the seat back cushion to be reclined in the interior cabin of the vehicle (e.g., between a first angle and a second angle) while providing conditioned air to the seat back cushion assembly.

In some embodiments, the seat bottom cushion assembly may include a first air diffusion assembly for diffusing conditioned air from the HVAC module to the seat bottom cushion assembly through the second air duct portion, through a surface of the seat bottom cushion assembly. The seat back cushion assembly may include a second air diffusion assembly for diffusing conditioned air from the HVAC module to the seat bottom cushion assembly through the third air duct portion, through a surface of the seat back cushion assembly.

In some embodiments, the first air diffusion assembly may include a first layer configured to channel the conditioned air, provided by the HVAC module to the seat bottom cushion assembly through the second air duct portion, through a first plurality of air channels in the first layer, and a second layer configured to channel the air from the plurality of air channels in the first layer through a plurality of through holes in the second layer, wherein the first plurality of through holes are arranged in a first predetermined pattern. The second air diffusion assembly may include a third layer configured to channel the air, provided by the HVAC module to the seat back cushion assembly through the third air duct portion, through a second plurality of air channels in the third layer; and a fourth layer configured to channel the air from the second plurality of air channels in the fourth layer through a plurality of through holes in the fourth layer, wherein the second plurality of through holes are arranged in a second predetermined pattern.

In some embodiments, the first diffusion assembly may further include a first baffle layer disposed between the first layer and the second layer, and the second diffusion assembly may further include a second baffle layer disposed between the third layer and the fourth layer.

In some embodiments, each of the first layer and the second layer may include a foam material.

In some embodiments, the ventilated seat does not include a blower, that is, the air duct interfaces directly with the HVAC module and the seat cushion assembly without an intermediate blower.

In some embodiments, the air duct may include a high-density-polyethylene (HDPE) material.

In some embodiments, the seat cushion assembly may include an electric seat heater.

In some embodiments, the conditioned air is heated air.

In some embodiments, a vehicle is provided. The vehicle includes a heating, ventilation, and air conditioning (HVAC) module configured to provide conditioned air, an air vent configured to direct conditioned air provided by the HVAC module to an interior cabin of the vehicle, and a ventilated seat including a seat cushion assembly, and an air duct configured to interface with the HVAC module of the vehicle and provide conditioned air from the HVAC module to the seat cushion assembly. The vehicle may include control circuitry, a seat temperature sensor, and an electric seat heater, and the control circuitry is configured to detect a seat temperature of the ventilated seat via the seat temperature sensor determine whether a difference between a desired temperature and the detected seat temperature is greater than a threshold value, in response to determining that the difference between the desired temperature and the detected seat temperature is greater than the threshold value, activate the electric seat heater, and in response to determining that the desired temperature is equal to the detected seat temperature, deactivating the electric seat heater.

In some embodiments, a method of controlling airflow in a vehicle having a ventilated seat is provided. The method includes detecting a cabin temperature of the cabin of the vehicle, providing conditioned air to the cabin based on the detected cabin temperature, and providing conditioned air to the ventilated seat. The conditioned air provided to the cabin and the conditioned air provided to the ventilated seat are provided from a single heating, ventilation, and air conditioning (HVAC) module.

In some embodiments, the method may further include detecting a seat temperature of the ventilated seat, and providing the conditioned air to the ventilated seat may be based on the detected seat temperature.

In some embodiments, the method may further include determining, when heating, whether a difference between a desired temperature and the detected seat temperature is greater than a threshold value, and in response to determining that the difference between the desired temperature and the detected seat temperature is greater than a threshold value, activating (e.g., turning on) electric heating in the ventilated seat.

In some embodiments, the method may further include determining, when heating, that the desired temperature is equal to the detected seat temperature, and in response to determining that the desired temperature is equal to the detected seat temperature, deactivating (e.g., turning off) the electric heating in the ventilated seat.

In some embodiments, the method may further include determining, when heating, that an occupant of the ventilated seat has left the ventilated seat, and in response to determining that the occupant of the ventilated seat has left the ventilated seat, stopping the providing of the conditioned air to the ventilated seat and activating (e.g., turning on) electric heating in the ventilated seat.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
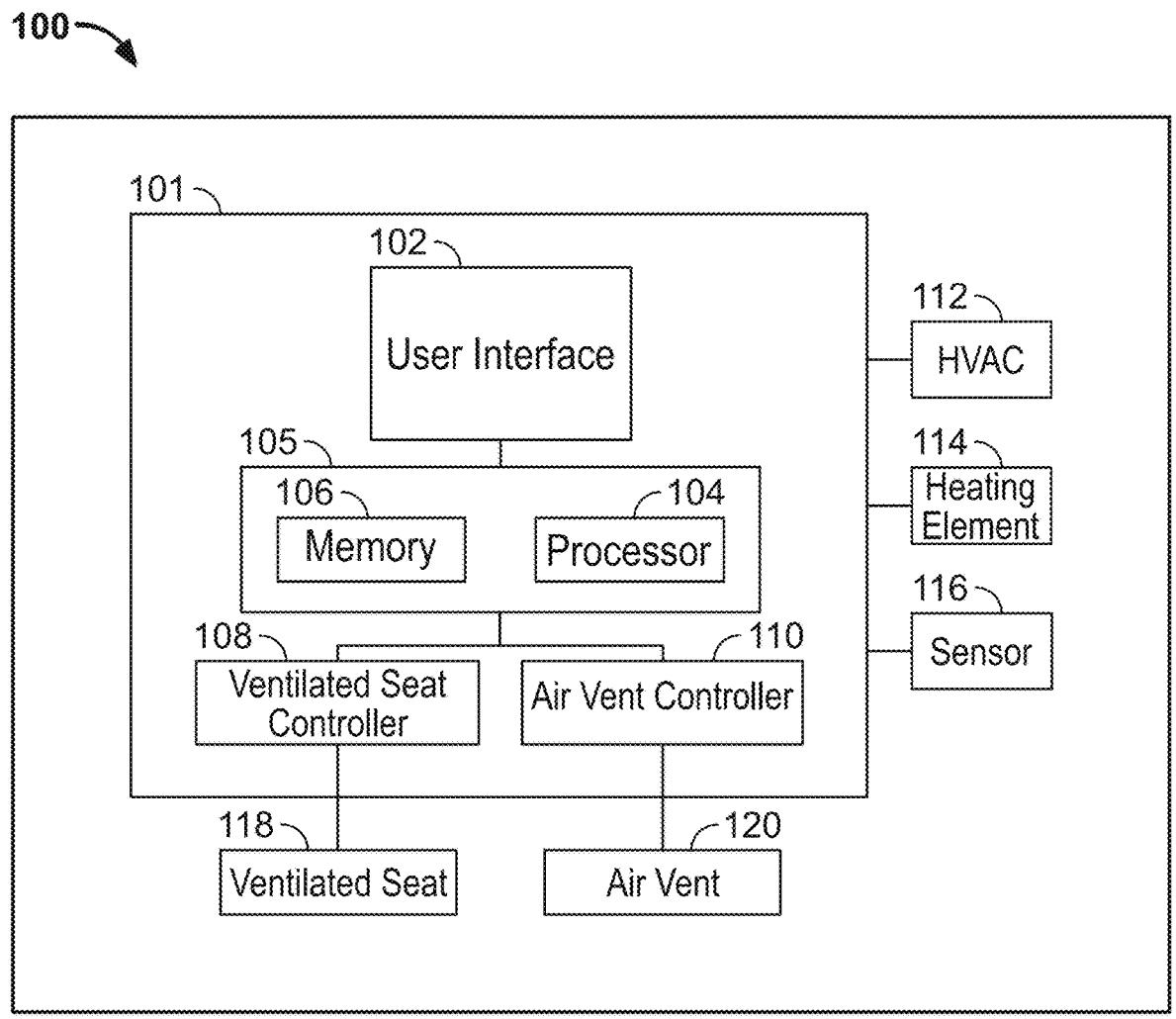
FIG. 1 depicts a block diagram of components of a ventilation system of a vehicle, in accordance with some embodiments of the present disclosure.

FIG. 1 depicts a block diagram of components of a ventilation system 100 of a vehicle, in accordance with some embodiments of the present disclosure. As shown, the ventilation system 100 includes a control system 101, an HVAC module 112, a heating element 114, one or more sensors 116, a ventilated seat 118, and an air vent 120. Although only a single ventilated seat and single air vent are shown, the ventilation system 100 may include any number of ventilated seats and air vents. As shown, the control system 101 includes a user interface 102, control circuitry 105, a ventilated seat controller 108, and an air vent controller 110. The control circuitry 105 further includes a processor 104 and a memory 106. In an illustrated example, the control system 101 may control the operation of the ventilation system 100.

The control circuitry 105 may include hardware, software, or both, implemented on one or more modules configured for controlling the operation of the ventilation system 100. In some embodiments, the processor 104 may include one or more processors such as, for example, a central processing unit having a single core or dual core, bus, logic circuitry, integrated circuitry, digital signal processor, graphics processor, an embedded processing device, any other suitable components for reading and executing computer instructions, or any combination thereof. The memory 106 may include any suitable storage device such as, for example, volatile memory, non-volatile memory, a removable storage device, a solid-state storage device, an optical device, a magnetic device, any other suitable component for storing and recalling information, or any combination thereof.

The user interface 102 may include a display (e.g., a touchscreen or touch sensitive display) provided as a stand-alone device or integrated with other elements of the control system 101. In some embodiments, the control circuitry 105 may be communicatively connected to the user interface 102. The user interface 102 may be used to receive selections from a user for setting the desired heating or cooling to be provided to the cabin of the vehicle (e.g., through the air vent 120) and the ventilated seat 118. For example, a user may input a desired temperature through the user interface 102.

The HVAC module 112 may include a blower, an evaporator, a heater, a recirculation system, an air mixing portion (for mixing hot/cool air), etc., and may provide conditioned air to both the ventilated seat 118 and the air vent 120. The control circuitry 105 may be communicatively connected to the HVAC module 112.

In some embodiments, the control circuitry 105 may be communicatively connected to the one or more sensors 116. In some embodiments, the one or more sensors 116 include an air temperature sensor for sensing the air temperature inside the vehicle, a seat air temperature sensor for sensing the temperature of the seat, an ambient air temperature sensor for sensing the ambient temperature outside of the vehicle, an occupancy sensor (e.g., a pressure sensor) for sensing an occupant in the ventilated seat, humidity sensors, and an open door sensor for sensing whether a door of the vehicle is open. However, these are simply examples, and the one or more sensors 116 may include any suitable sensors for operating the ventilation system 100.

In some embodiments, the control circuitry 105 may be communicatively connected (e.g., via the air vent controller 110) to the air vent 120. Although only a single air vent 120 is illustrated, the ventilation system 100 may include a plurality of air vents to direct conditioned air from the HVAC module 112 to different areas of the vehicle. The control circuitry 105 may be communicatively connected (e.g., via the ventilated seat controller 108) to the ventilated seat 118.

In some embodiments, the ventilated seat 118 may include the heating element 114. The control circuitry 105 may be communicatively connected to the heating element 114 to provide heating to an occupant of the ventilated seat 118, as explained in greater detail below.

Figure 2A:
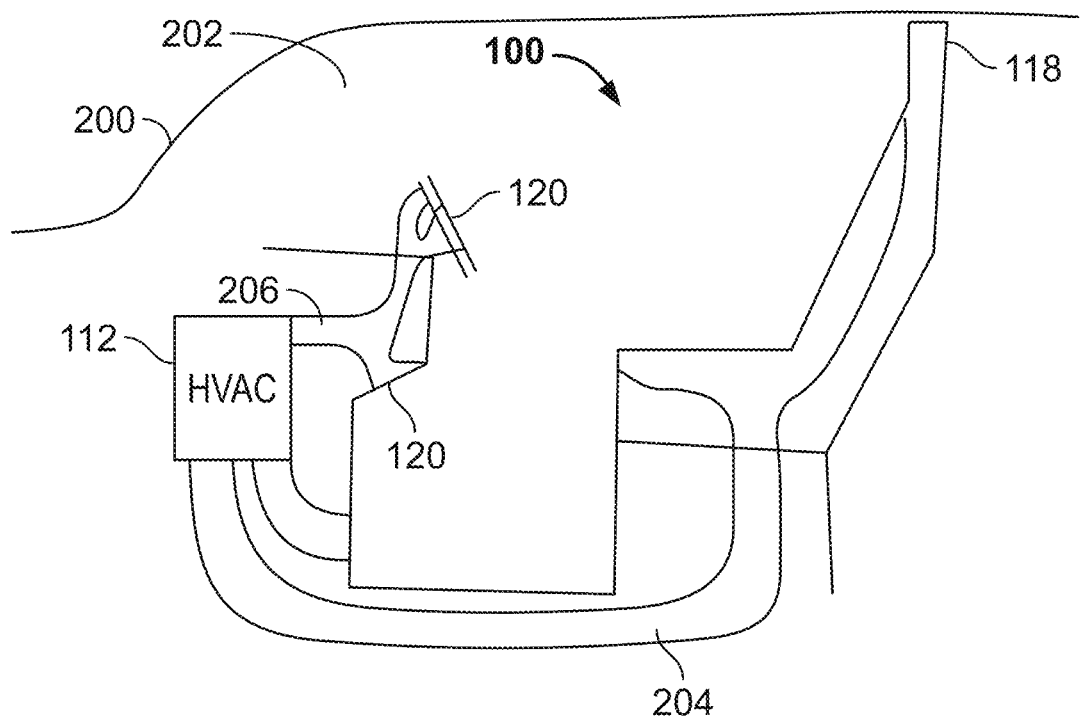
FIGS. 2A and 2B depict views of components of the ventilation system of FIG. 1 installed in a vehicle, in accordance with some embodiments of the present disclosure.
Figure 2B:
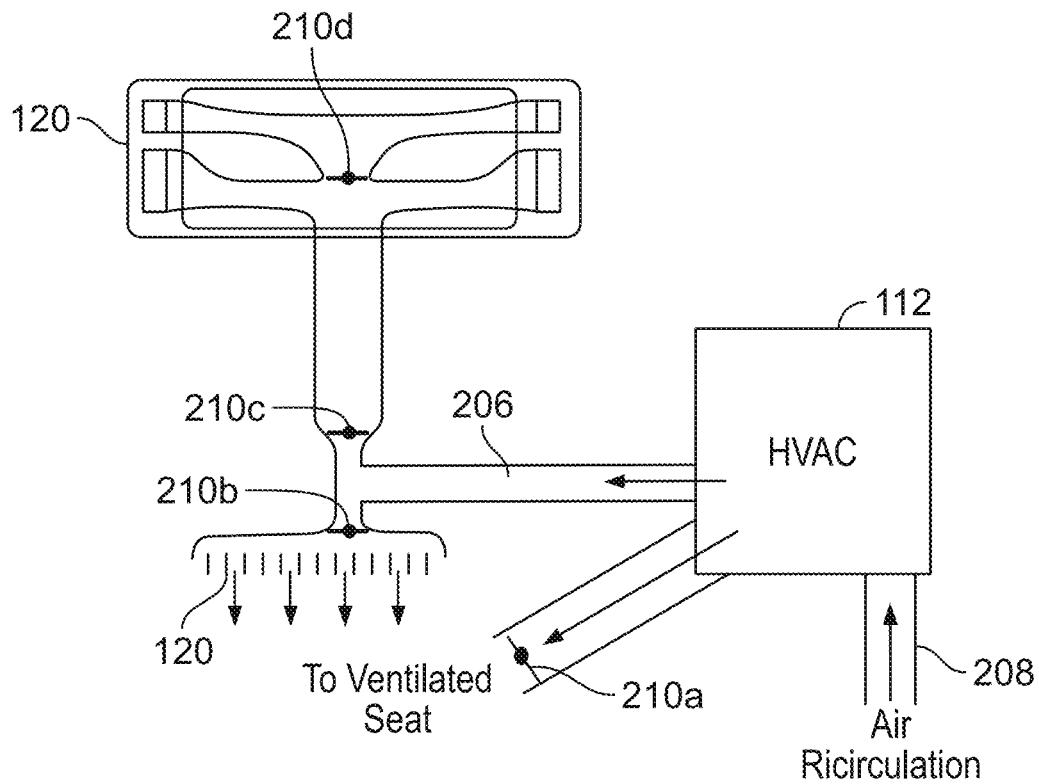

FIGS. 2A and 2B depict views of components of the ventilation system 100 of FIG. 1 installed in a vehicle 200, in accordance with some embodiments of the present disclosure. As shown, the ventilation system 100 includes a single HVAC module 112 that provides conditioned air to both the interior cabin 202 of the vehicle 200 (through the air vents 120), and to the ventilated seat 118. As shown, the ventilation system 100 includes a first air duct 204 that provides conditioned air from the HVAC module 112 to the ventilated seat 118, and a second air duct 206 that provides conditioned air from the HVAC module 112 to the air vents 120. Although only two air ducts (204 and 206) are shown, the ventilation system 100 may include any number of air ducts for piping conditioned air from the HVAC module 112 to different areas of the vehicle 200.

In some embodiments, airflow through the ventilated seat 118 and the air vents 120 may be controlled via at least one motor-controlled or actuator-controlled valve (210a, 210b, 210c, 210d). For example, the control circuitry 105 may control the valves (210a, 210b, 210c, 210d) via the ventilated seat controller 108 and the air vent controller 110 to provide conditioned air from the HVAC module 112. It should be understood that the valves (210a, 210b, 210c, 210d) may be located at any point between the output of the HVAC module 112 and output of the ventilated seat 118 and the air vents 120. In some embodiments, the ventilation system 100 may include an air recirculation path 208 for recirculating air in the interior cabin 202 of the vehicle 200 back through the HVAC module 112. It should be understood that the valves (210a, 210b, 210c, 210d) are merely illustrative and that any suitable number and type of valves can be used (e.g., a flow divider valve that adjusts the flow between two ducts). For example, valves 210b and 210c may be replaced by a single flow divider valve.

Figure 3:
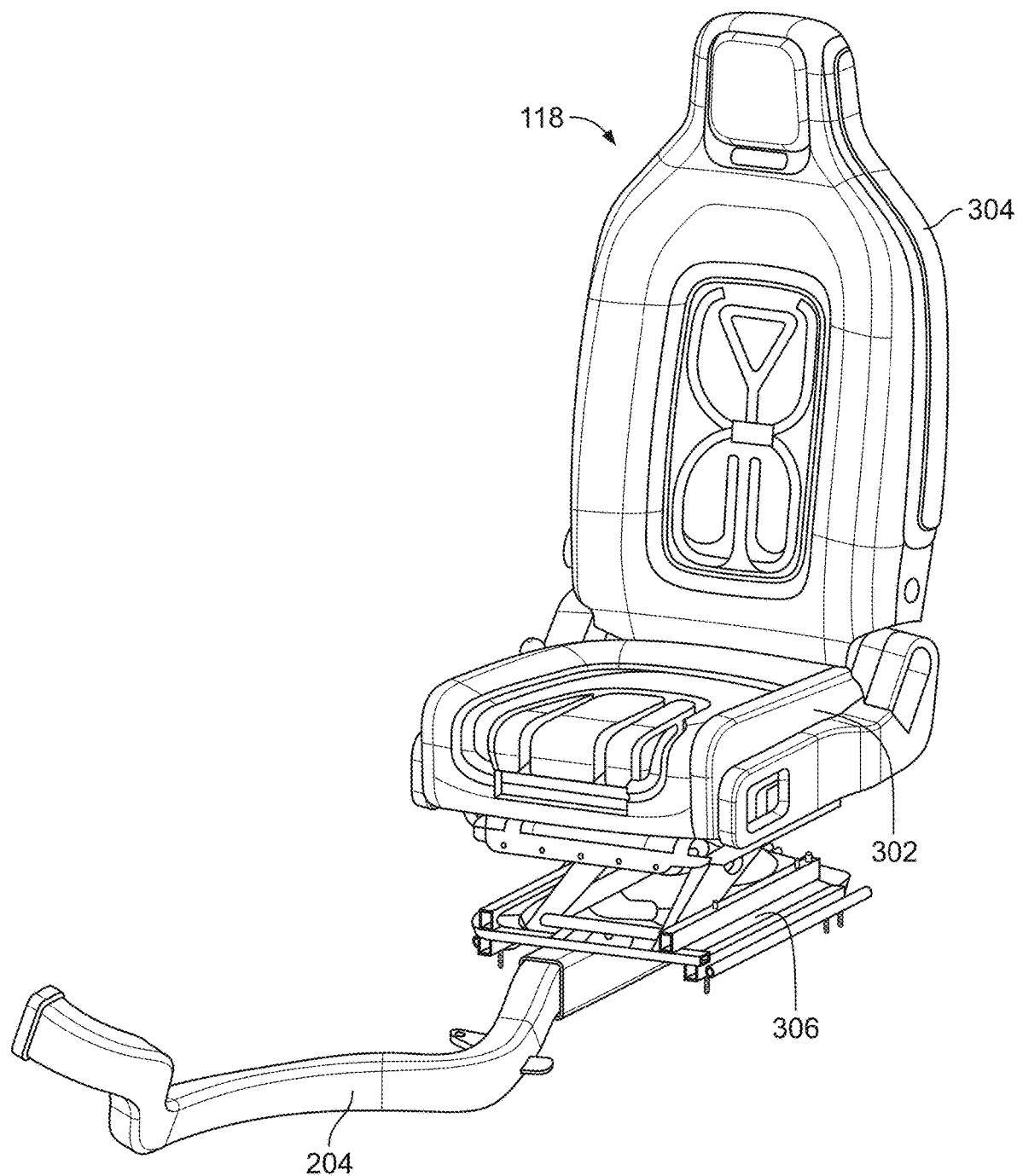
FIG. 3 depicts a detailed view of the ventilated seat and the first air duct of FIG. 2A, in accordance with some embodiments of the present disclosure.

FIG. 3 depicts a detailed view of the ventilated seat 118 and the first air duct 204 of FIG. 2A, in accordance with some embodiments of the present disclosure. As shown, the ventilated seat 118 includes a seat cushion assembly including a seat bottom cushion assembly 302 and a seat back cushion assembly 304. The ventilated seat 118 may further include a seat mount 306 for mounting the ventilated seat in a vehicle (e.g., the vehicle 200).

Figure 4:
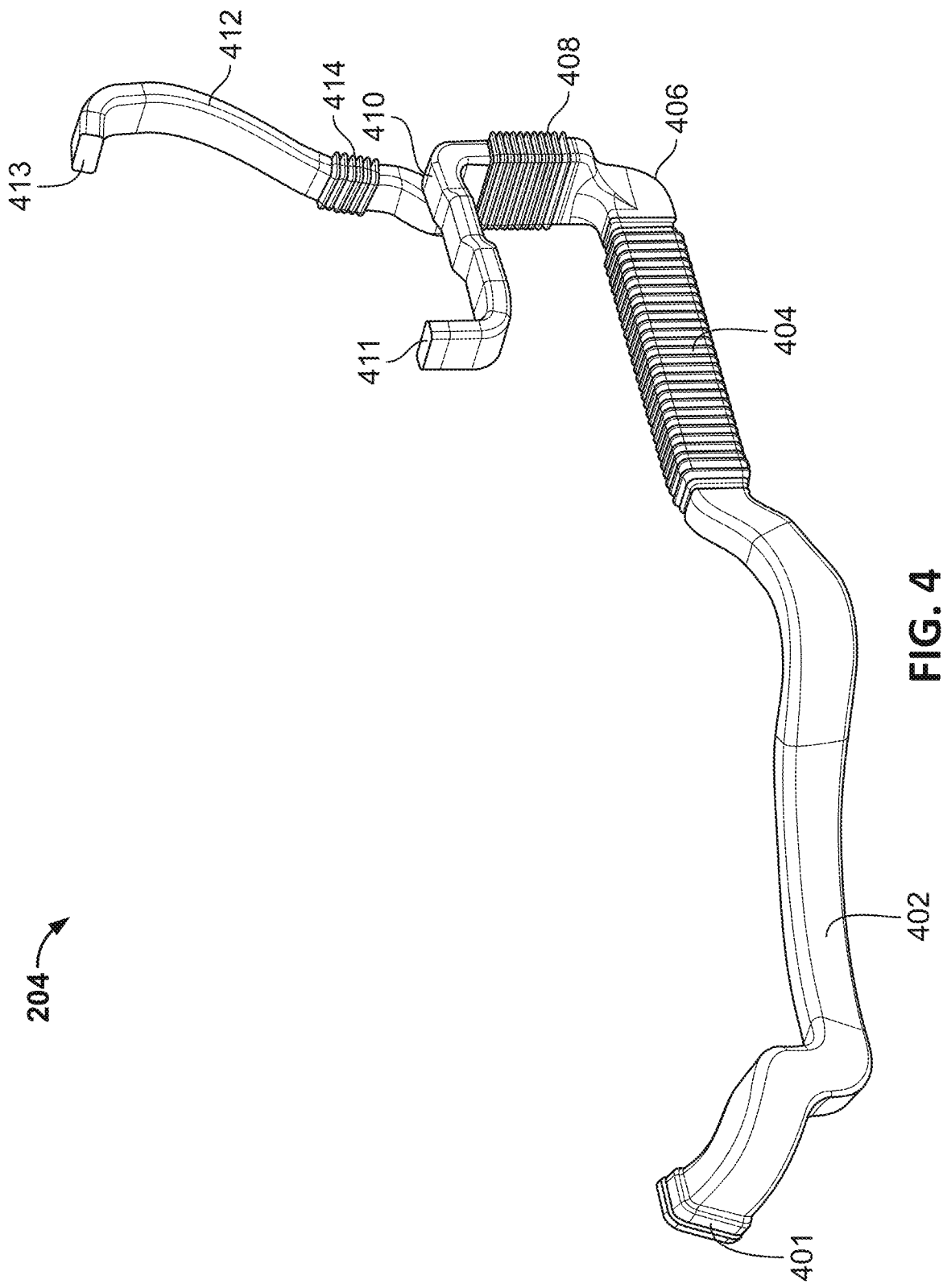
FIG. 4 depicts a view of the first air duct of FIG. 3, in accordance with some embodiments of the present disclosure.

FIG. 4 depicts a view of the first air duct 204 of FIG. 3, in accordance with some embodiments of the present disclosure. As shown, the first air duct 204 includes a first air duct portion 402 extending from an HVAC module interface 401 to a splitter portion 406, a second air duct portion 410 extending from the splitter portion 406 to a seat bottom cushion assembly interface 411, and a third air duct portion 412 extending from the splitter portion 406 to a seat back cushion assembly interface 413. The HVAC module interface 401 is configured to attach to the HVAC module 112, the seat bottom cushion assembly interface 411 is configured to attach to the seat bottom cushion assembly 302, and the seat back cushion assembly interface 413 is configured to attach to the seat back cushion assembly 304.

In some embodiments, the first air duct 204 may include extendable sections that allow the ventilated seat 118 to be moved within the vehicle 200. Such extendable sections may be configured to be moved and/or reshaped in order to connect (i.e., allow airflow between) two portions of air duct 204 when the two portions are at different positions relative to one another (e.g., positioned at different lengths apart). In some embodiments, such extendable sections may be corrugated (e.g., accordion folded) to allow the extendable section to compress or extend to different lengths. Additionally or alternatively, in some embodiments such extendable sections are of a flexible material and shaped (e.g., S-shaped) to allow connection between portions of air duct 204 at multiple positions. For ease of description, such extendable sections are described herein as accordion sections, however, it should be understood that any suitable extendable section, as set forth above, may be used. For example, as shown, the first air duct portion 402 includes a first accordion section 404 that is extendable between a first length and a second length to allow the ventilated seat 118 to move forwards and backwards in the vehicle 200 between a forward position and a rear position while continuing to provide airflow therethrough, and the splitter portion 406 includes a second accordion section 408 that is extendable between a third length and fourth length to allow the ventilated seat 118 to be raised and lowered in the vehicle 200 between a first height and a second height while continuing to provide airflow therethrough. Additionally, the third air duct portion 412 includes a hinge section 414 that allows the seat back cushion assembly 304 to be reclined in the vehicle 200 between a first angle and a second angle while continuing to provide airflow therethrough.

In some embodiments, the first air duct 204 comprises a high-density-polyethylene (HDPE) material. In some embodiments, the first accordion section 404, the second accordion section 408, and the hinge section 414 may comprise a flexible material (e.g., rubber, fiber, etc.) to provide the functionality discussed above. It may be advantageous to modify the shape of the first air duct 204 or the number of accordion/hinge sections included in the first air duct 204, depending on the requirements of the vehicle where the ventilated seat will be installed.

Figure 5A:
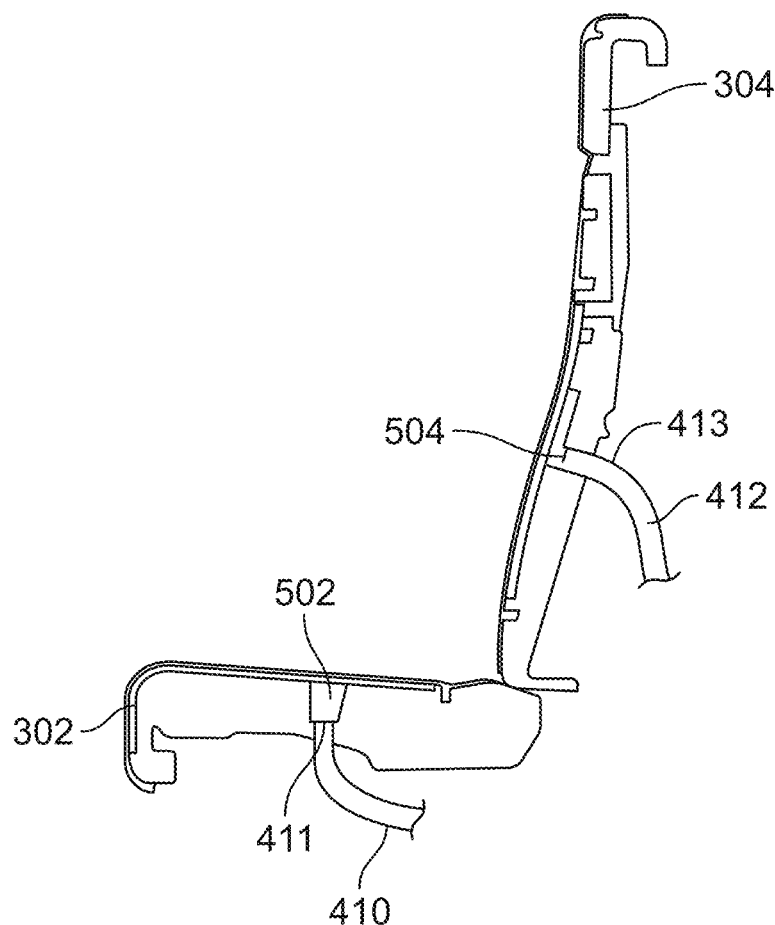
FIGS. 5A and 5B depict cutaway views of the ventilated seat of FIG. 3, in accordance with some embodiments of the present disclosure.
Figure 5B:
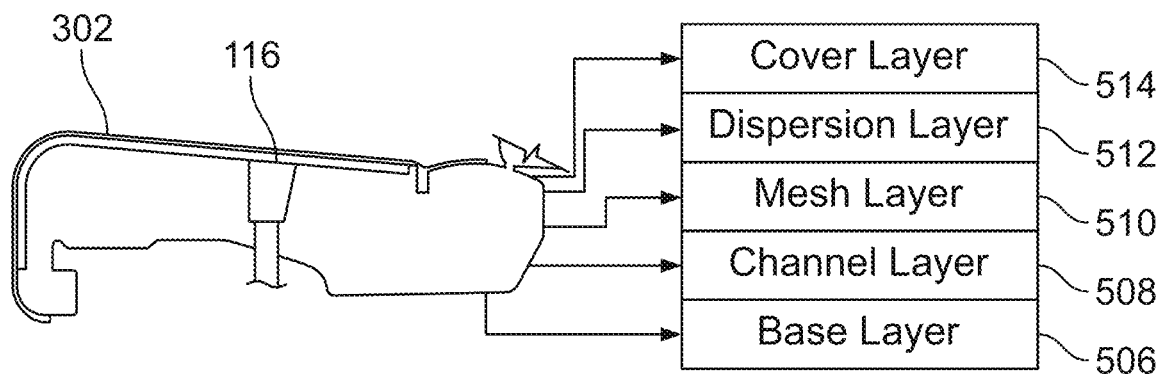

FIGS. 5A and 5B depict cutaway views of the ventilated seat 118 of FIG. 3, in accordance with some embodiments of the present disclosure. As shown in FIG. 5A, the seat bottom cushion assembly 302 includes a first interface 502 for connecting to the seat bottom cushion assembly interface 411 of the second air duct portion 410, while the seat back cushion assembly 304 includes a second interface 504 for connecting to the seat back cushion assembly interface 413 of the third air duct portion 412.

FIG. 5B depicts a cutaway view of certain layers of the seat bottom cushion assembly 302. As shown, the seat bottom cushion assembly 302 includes a base layer 506, a channel layer 508, a mesh layer 510, a dispersion layer 512, and a cover layer 514. The base layer 506 may comprise a hard plastic or other material that forms the base layer of the seat bottom cushion assembly 302. The channel layer 508 may include a plurality of air channels configured to distribute conditioned air from the HVAC module 112 across an area of the seat bottom cushion assembly 302, as shown in greater detail in FIG. 6A. In some embodiments, the channel layer 508 may comprise a foam or other suitable material. The mesh layer 510 may comprise a porous backing layer (e.g., a spreader layer) configured to diffuse the air in the plurality of channels of the channel layer 508. The dispersion layer 512 may include a plurality of through holes arranged in a predetermined pattern for optimizing the flow of conditioned air to the occupant of the seat, as shown in greater detail in FIG. 6B. The cover layer 514 may include a cover for the ventilated seat 118, as well as additional padding to improve seat comfort. The cover may be perforated to allow air to flow through the seat bottom cushion assembly 302 to the occupant of the ventilated seat.

In some embodiments, the seat bottom cushion assembly 302 may include the heating element 114. The heating element 114 may be incorporated into one of the layers described above or disposed between the layers. In some embodiments, the seat back cushion assembly 304 may further include at least one sensor 116. For example, the at least one sensor 116 may include an occupancy sensor (e.g., a pressure sensor) and a temperature sensor. In some embodiments, as shown, the at least one sensor 116 (e.g., a pressure sensor) may be mounted at the first interface 502 to further diffuse the conditioned air from the HVAC module 112 before it flows through the plurality of channels in the channel layer 508. However, this is only one example, and the at least one sensor 116 may be mounted at any suitable location.

The composition of the seat back cushion assembly 304 may be similar to the above-described composition of the seat bottom cushion assembly 302 and will not be described again in detail.

Figure 6B:
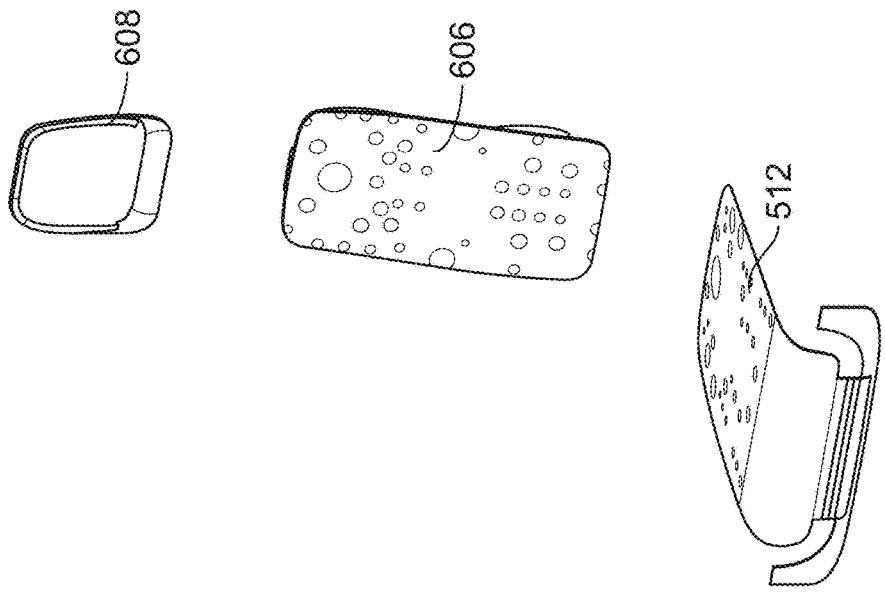
FIGS. 6A, 6B, and 6C depict views of certain layers of the ventilated seat of FIGS. 5A and 5B, in accordance with some embodiments of the present disclosure.
Figure 6A:
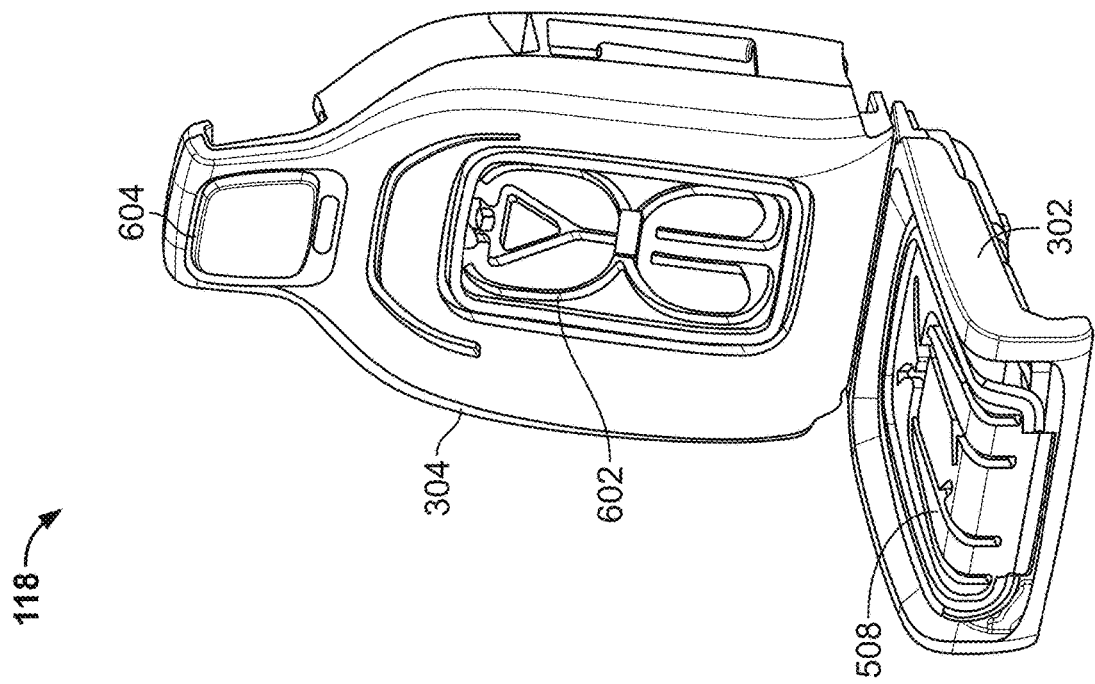
Figure 6C:
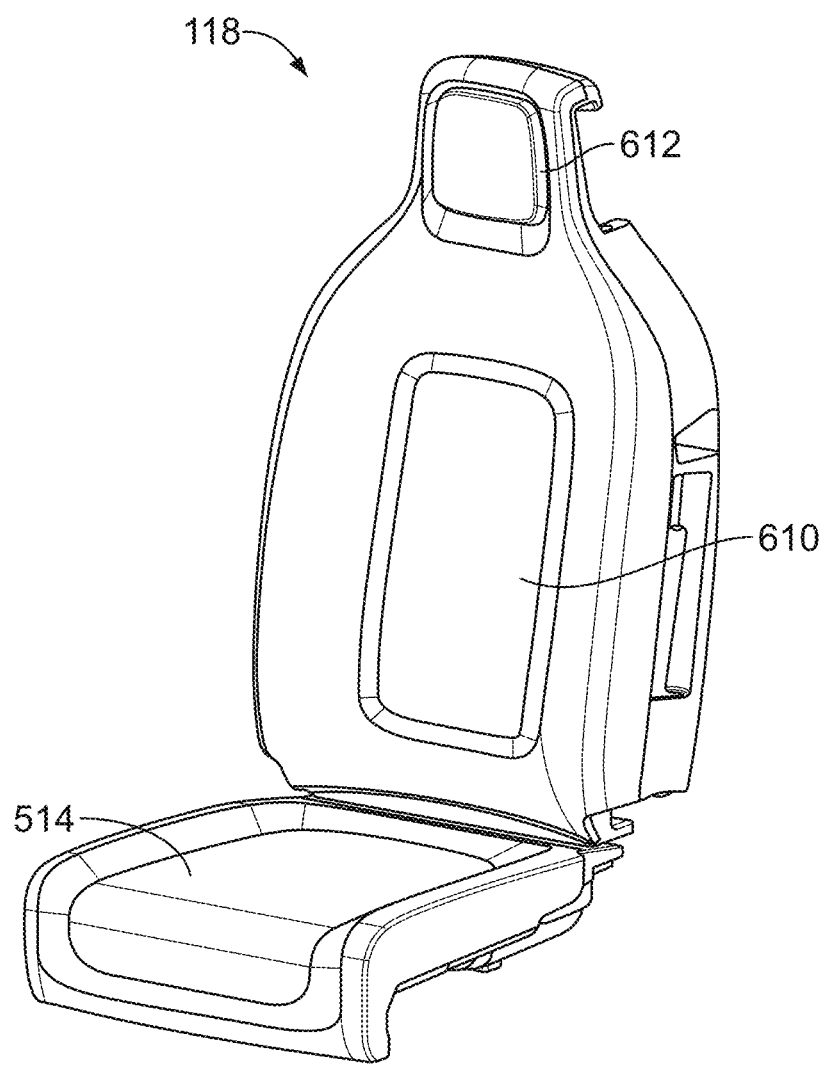

FIGS. 6A, 6B, and 6C depict views of certain layers of the ventilated seat 118 of FIGS. 5A and 5B, in accordance with some embodiments of the present disclosure. FIG. 6A depicts the channel layer 508 of FIG. 5B. As shown, the channel layer 508 includes a plurality of channels configured to distribute conditioned air from the HVAC module 112 across an area of the seat bottom cushion assembly 302. As shown, the seat back cushion assembly 304 includes a similar channel layer 602 that includes a plurality of channels configured to distribute conditioned air from the HVAC module 112 across an area of the seat back cushion assembly 304. In some embodiments, the seat back cushion assembly 304 may include an additional channel layer 604 configured to distribute conditioned air from the HVAC module 112 across another area of the seat back cushion assembly 304 (e.g., around the head of an occupant).

FIG. 6B depicts the dispersion layer 512 of FIG. 5B. As shown, the dispersion layer 512 includes a plurality of through holes arranged in a predetermined pattern for optimizing the flow of conditioned air to the occupant of the seat. As shown, the seat back cushion assembly 304 includes a similar dispersion layer 606 including a different arrangement of through holes for optimizing the flow of conditioned air to the occupant of the seat. In some embodiments, the seat back cushion assembly 304 may include an additional dispersion layer 608 for optioning the flow of conditioned air across another area of the seat back cushion assembly 304 (e.g., around the head of an occupant).

FIG. 6C depicts the cover layer 514 of FIG. 5B. As shown, the cover layer 514 includes a portion of the cover for the ventilated seat 118. In some embodiments, as described above, the portion of the cover may be perforated to allow air to flow through the seat bottom cushion assembly 302 to the occupant of the ventilated seat 118. In some embodiments, the cover layer 514 may comprise the cover for the entire seat bottom assembly. As shown, the seat back cushion assembly 304 includes cover layers 610 and 612, which include respective portions of the cover for the ventilated seat 118. In some embodiments, the cover layers 514, 610, and 612 may comprise a different material than other portions of the cover of the ventilated seat 118. For example, the cover layers 514, 610, and 612 may be optimized to allow the conditioned air from the HVAC module 112 to pass through to the occupant of the ventilated seat 118.

Figure 7:
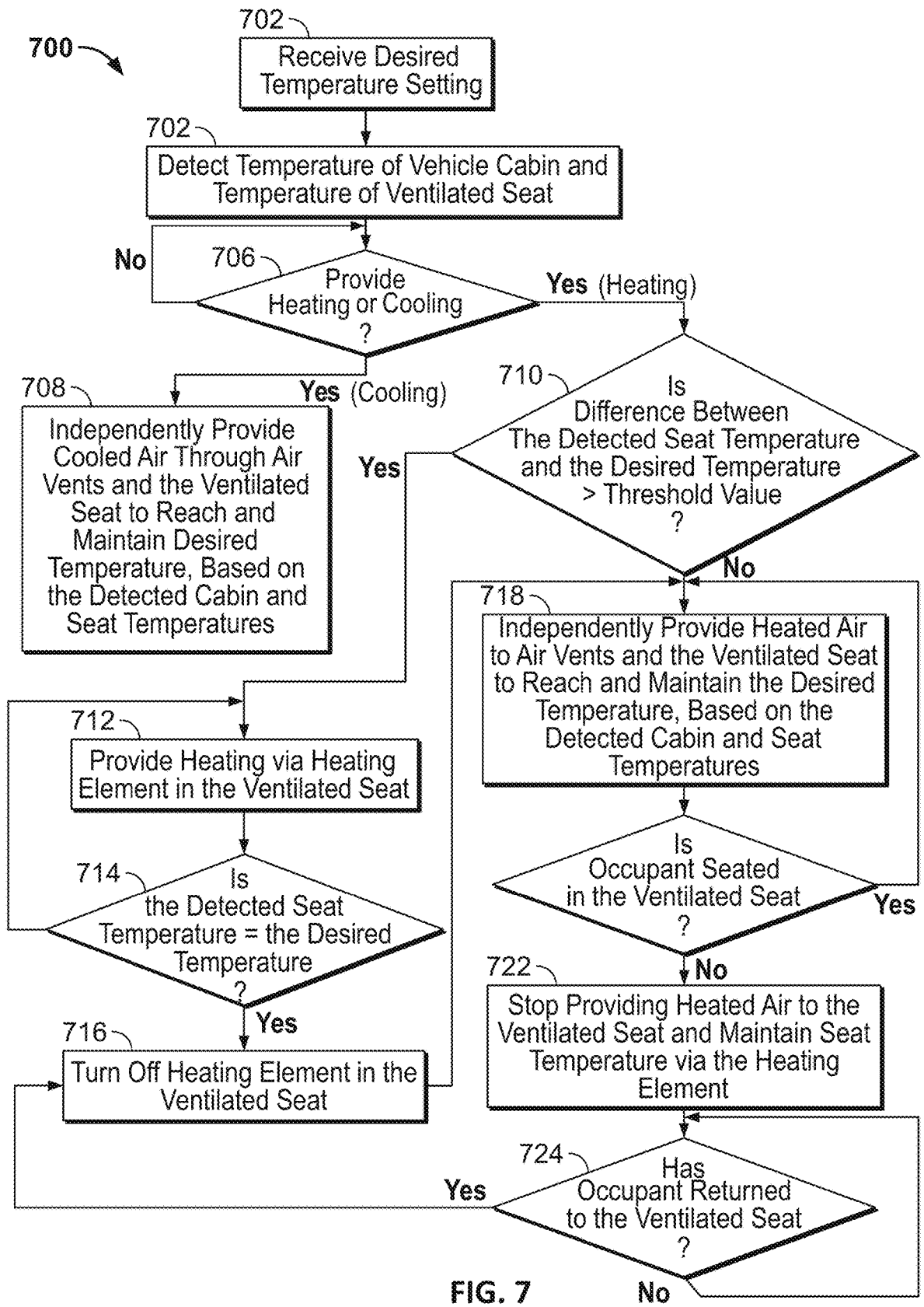
FIG. 7 depicts an illustrative process for controlling a ventilation system of a vehicle, in accordance with some embodiments of the present disclosure.

FIG. 7 depicts an illustrative process 700 for controlling a ventilation system (e.g., the ventilation system 100 of FIG. 1) of a vehicle (e.g., the vehicle 200 of FIG. 2A), in accordance with some embodiments of the present disclosure. The process 700 may be executed by control circuitry (e.g., by the control circuitry 105 including the processor 104 of FIG. 1).

At step 702, the control circuitry may receive a desired temperature setting. For example, the control circuitry may receive a selection by a user (e.g., via the user interface 102) of the desired temperature. In some embodiments, the user may independently set desired temperatures for different areas of the vehicle cabin and separately set a heating/cooling level for the ventilated seats (e.g., the ventilated seat 118). For example, the user may set the desired temperature of the vehicle cabin to seventy-five degrees Fahrenheit and indicate whether to turn on seat heating/cooling. In some embodiments, if the user selects seat heating/cooling, the user may set a seat heating/cooling level (e.g., among a plurality of settings such as low, medium, and high), and the control circuitry may adjust accordingly (e.g., based on the desired temperature). However, this is only an example, and the user may set a single desired temperature for the vehicle, and the control circuitry may automatically engage/disengage seat heating/cooling. Although the vehicle may include multiple ventilated seats, for convenience of description, the process 700 is described in terms of one ventilated seat and one desired temperature. However, it should be understood that different settings may be set for each ventilated seat in a vehicle (e.g., occupants of different ventilated seats may set different desired temperatures or select different seat heating/cooling levels). In some embodiments, the control circuitry may automatically select a temperature setting, based on a profile of an occupant of the vehicle and the ambient temperature.

At step 704, the control circuitry may detect (e.g., via at least one sensor 116) the temperature of the vehicle cabin. In some embodiments, the control circuitry 105 may also detect (e.g., via the at least one sensor 116) the temperature of the ventilated seat. In some embodiments, the control circuitry 105 may also detect (e.g., via the at least one sensor 116) an ambient temperature.

At step 706, the control circuitry may determine whether to provide heating or cooling. For example, the control circuitry may compare the desired temperature setting with the detected temperatures of the vehicle cabin and of the ventilated seats. If the control circuitry determines that cooling is required ("Yes (cooling)" at step 706), the process 700 proceeds to step 708. Alternatively, if the control circuitry determines that heating is required ("Yes (heating)" at step 706), the process 700 proceeds to step 710. Otherwise, if the control circuitry determines that neither heating or cooling is required (e.g., the desired temperature has already been reached), the control circuitry remains at step 706 until either heating or cooling is required.

At step 708, the control circuitry independently provides cooled air to the cabin of the vehicle through air vents (e.g., the air vents 120) and to the ventilated seat, in order to reach and maintain the desired temperature, based on the detected cabin and seat temperatures. In some embodiments, the control circuitry may change the rate of cooling (e.g., by changing the airflow or coldness of the air) provided through the air vents and the ventilated seat, based on the difference between the desired temperature and the detected temperatures. For example, the control circuitry may initially provide maximized cooling and slowly decrease the cooling level as the cabin and ventilated seat temperatures approach the desired temperature. In some embodiments, the user can select the rate of cooling.

At step 710, the control circuitry may determine if the difference between the detected seat temperature and the desired temperature is greater than a threshold value in order to optimize heating with energy use and comfort of the occupant of the vehicle. For example, if the control circuitry determines that the seat temperature does not need to be increased more than a threshold value (e.g., twenty degrees Fahrenheit), the control circuitry may only provide heated air to the ventilated seat and forgo the use of a heating element in the ventilated seat. If however, the control circuitry determines that the seat temperature does need to be increased more than a threshold value, the control circuitry may also use the heating element to maximize the comfort of the occupant of the vehicle. The threshold value may be set or optimized based on the preferences of the occupant of the vehicle. If the control circuitry determines that the difference between the detected seat temperature and the desired temperature is greater than the threshold value ("Yes" at step 710), the process 700 proceeds to step 712. Otherwise ("No" at step 710), the process 700 proceeds to step 718.

At step 712, the control circuitry may provide (e.g., via the heating element 114) heating in the ventilated seat. In some embodiments, if the control circuitry determines it will take the HVAC module a few moments before the HVAC module is able to provide heated air (e.g., when the ambient temperature is low and the HVAC module is cold), the control circuitry may wait until the HVAC module is able to provide heated air before directing conditioned air through the ventilated seat. However, this is only one example, and the control circuitry may also provide heating via both the heating element and the HVAC module (e.g., via the air vents and the ventilated seat).

At step 714, the control circuitry may determine if the detected seat temperature has reached the desired temperature. If the control circuitry determines that the detected seat temperature is not equal to the desired temperature ("No" at step 714), the process 700 proceeds back to 712 and continues to provide heating via the heating element. Otherwise, the process 700 proceeds to step 716. In some embodiments, instead of determining whether the detected seat temperature is not equal to the desired temperature, the process 700 may proceed to step 716 in response to the control circuitry determining that the detected seat temperature is within a predetermined range of the desired temperature (e.g., within 5 or 10 degrees) or that the HVAC module is able to provide sufficiently heated air to the ventilated seat.

At step 716, the control circuitry turns off the heating element in the ventilated seat. For example, because the heating element may not be as energy-efficient as the HVAC module, it may be advantageous to maintain the temperature of the ventilated seat and the vehicle cabin using only the HVAC module. However, this is only one example, and the control circuitry may optionally leave the heating element on or lower the heating provided by the heating element based on, for example, user preference.

At step 718, the control circuitry may independently provide heated air (e.g., via the HVAC module) to air vents and the ventilated seat to reach and maintain the desired temperature, based on the detected vehicle cabin and seat temperatures. In some embodiments, it may be advantageous to change the rate of heating. For example, if the vehicle is cold, the control circuitry may initially provide maximum heating (e.g., by controlling the HVAC module to maximize the temperature of the conditioned air and the blower speed). As the detected temperature approaches the desired temperature, the control circuitry may taper the heating level.

At step 720, the control circuitry may determine if an occupant is seated in the ventilated seat. For example, if the ventilated seat is installed in a delivery vehicle, the vehicle occupant may often leave the vehicle (e.g., to deliver packages). In this case, it may be inefficient to provide heated air to the ventilated seat, especially if the door of the vehicle is open. Thus, if the control circuitry determines that the occupant is seated in the ventilated seat ("Yes" at step 720), the process 700 may return to step 718 and continue to provide heated air. Otherwise ("No" at step 720), the process 700 may proceed to step 722.

At step 722, the control circuitry may stop providing heated air to the ventilated seat and maintain the ventilated seat temperature (e.g., until the occupant returns) using only the heating element. In this manner, energy may be conserved while the occupant is not in the vehicle (e.g., especially if the door of the vehicle is open), while still keeping the ventilated seat heated.

At step 724, the control circuitry determines if the occupant has returned to the ventilated seat. If the control circuitry determines that the occupant has returned to the ventilated seat ("Yes" at step 724), the process 700 returns back to step 716. Otherwise ("No" at step 724), the process continues to monitor the ventilated seat.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, in some implementations, when a heating element is not included or when a user elects not to turn on a heating element, steps 710, 712, 714, and 716 can be omitted. In some implementations, the seat occupancy decision block (step 720) may also be omitted (e.g., with or without the heating element being included). For example, the seat occupancy decision block may be associated with an Eco mode that the user elects to turn off. In this case, steps 722 and 724 may also be omitted.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:
1. A ventilated seat comprising:
   an air duct configured to provide conditioned air to a first air assembly from a heating, ventilation, and air conditioning (HVAC) module; and
   an occupancy sensor mounted at an interface between the air duct and the first air assembly, wherein:
      the HVAC module further provides the conditioned air to an interior cabin of a vehicle;
      the conditioned air is diffused based on the occupancy sensor and provided to the first air assembly; and
      the first air assembly provides the diffused conditioned air through a surface of a first seat cushion.
2. The ventilated seat of claim 1, wherein:
   the air duct comprises a first section that is extendable to allow the ventilated seat to move in a first direction in the interior cabin of the vehicle.
3. The ventilated seat of claim 2, further comprising a second air assembly, wherein:
   the air duct is further configured to provide the conditioned air to the second air assembly from the HVAC module;
   the second air assembly is configured to diffuse the conditioned air and provide the diffused conditioned air through a surface of a second seat cushion; and the air duct comprises:
a splitter portion;
a first air duct portion, including the first section, extending from the HVAC module to the splitter portion;
a second air duct portion extending from the splitter portion to the first air assembly; and
a third air duct portion extending from the splitter portion to the second air assembly.

4. The ventilated seat of claim 3, wherein:
the splitter portion comprises a second section that is extendable to allow the ventilated seat to move in a second direction in the interior cabin of the vehicle; and
the third air duct portion comprises a flexible section that allows the second seat cushion to be reclined in the interior cabin of the vehicle.

5. The ventilated seat of claim 4, wherein the first direction is a forward direction and the second direction is an upward direction.

6. The ventilated seat of claim 1, further comprising a second air assembly, wherein:
the first air assembly comprises:
a first layer configured to channel the conditioned air through a first plurality of air channels in the first layer; and
a second layer configured to channel the conditioned air from the first plurality of air channels in the first layer through a plurality of through holes in the second layer; and
the second air assembly comprises:
a third layer configured to channel the air through a second plurality of air channels in the third layer; and
a fourth layer configured to channel the conditioned air from the second plurality of air channels in the fourth layer through a plurality of through holes in the fourth layer.

7. The ventilated seat of claim 6, wherein:
the first air assembly further comprises a first baffle layer disposed between the first layer and the second layer; and
the second air assembly further comprises a second baffle layer disposed between the third layer and the fourth layer.

8. The ventilated seat of claim 1, wherein the air duct is configured to interface directly with the HVAC module and the first air assembly without an intermediate blower.

9. The ventilated seat of claim 1, wherein the air duct comprises a high-density-polyethylene (HDPE) material.

10. The ventilated seat of claim 1, wherein the first seat cushion comprises an electric seat heater.

11. The ventilated seat of claim 1, wherein the first air assembly comprises:
a first layer configured to channel the diffused conditioned air through a first plurality of air channels in the first layer;
a second layer configured to further diffuse the diffused conditioned air from the first plurality of air channels;
a third layer configured to channel the further diffused conditioned air from the second layer through a plurality of through holes in the third layer; and
a fourth layer configured to provide the further diffused conditioned air through a perforated surface of the first seat cushion.

12. The ventilated seat of claim 11, further comprising a fifth layer that forms a base layer of the first air assembly.

13. A vehicle, comprising:
a ventilated seat comprising:
a first cushion assembly comprising a seat temperature sensor and an electric seat heater;
an air duct configured to provide conditioned air to the first cushion assembly from a heating, ventilation, and air conditioning (HVAC) module;
an occupancy sensor mounted at an interface between the air duct and the first cushion assembly, wherein:
the HVAC module further provides the conditioned air to an interior cabin of a vehicle;
the conditioned air is diffused based on the occupancy sensor and provided to the first cushion assembly; and
the first cushion assembly provides the diffused conditioned air through a surface of the first cushion assembly; and
control circuitry configured to:
compare a desired temperature and a detected temperature of the first cushion assembly; and
in response to the comparison, determine whether to activate or deactivate the electric seat heater.

14. The vehicle of claim 13, wherein the control circuitry is further configured to deactivate, in response to determining that the desired temperature is equal to the detected temperature of the first cushion assembly, the electric seat heater.

15. The vehicle of claim 13, wherein the ventilated seat further comprises a second cushion assembly, wherein the air duct is configured to provide conditioned air from the HVAC module to the second cushion assembly, and wherein the air duct comprises:
a splitter portion;
a first air duct portion connecting the HVAC module to the splitter portion, wherein the first air duct portion comprises a first section that is extendable to allow the ventilated seat to move in a first direction in the interior cabin of the vehicle;
a second air duct portion connecting the splitter portion to the first cushion assembly; and
a third air duct portion connecting the splitter portion to the second cushion assembly.

16. A method of controlling airflow in a vehicle having a ventilated seat, the method comprising:
providing conditioned air to the ventilated seat;
determining, when providing the conditioned air to the ventilated seat, that an occupant of the ventilated seat has left the ventilated seat; and
in response to determining that the occupant of the ventilated seat has left the ventilated seat, stopping the providing of the conditioned air to the ventilated seat and activating an electric heater in the ventilated seat.

17. The method of claim 16, further comprising:
determining that the occupant of the ventilated seat has returned to the ventilated seat; and
in response to determining that the occupant of the ventilated seat has returned to the ventilated seat, deactivating the electric heater in the ventilated seat and resuming the providing of the conditioned air to the ventilated seat.

18. The method of claim 17, further comprising:
detecting a cabin temperature of a cabin of the vehicle; and
providing conditioned air to the cabin based on the detected cabin temperature.

19. The method of claim 16, further comprising detecting a seat temperature of the ventilated seat, wherein the providing the conditioned air to the ventilated seat is based on the detected seat temperature.

20. The method of claim 19, further comprising:
determining whether a desired temperature exceeds the detected seat temperature by more than a threshold value;
in response to determining that the desired temperature exceeds the detected seat temperature by more than the threshold value, activating electric heating in the ventilated seat;
determining that the desired temperature is equal to the detected seat temperature; and
in response to determining that the desired temperature is equal to the detected seat temperature, deactivating the electric heater in the ventilated seat.

* * * * *